United States Patent
Dollfus

[11] Patent Number: 5,453,192
[45] Date of Patent: Sep. 26, 1995

[54] MULTISTAGE CENTRIFUGAL EXTRACTOR

[75] Inventor: Jacques Dollfus, les Essarts, France

[73] Assignee: SGN Societe Generale pour les Techniques Nouvelles, St. Quentin en Yvelines, France

[21] Appl. No.: 955,886

[22] PCT Filed: Apr. 30, 1992

[86] PCT No.: PCT/FR92/00387

§ 371 Date: Dec. 7, 1992

§ 102(e) Date: Dec. 7, 1992

[87] PCT Pub. No.: WO92/19371

PCT Pub. Date: Nov. 12, 1992

[30] Foreign Application Priority Data

May 3, 1991 [FR] France ................................ 91 05463

[51] Int. Cl.⁶ ................................................ B01D 11/04
[52] U.S. Cl. ........................................ 210/380.1; 210/511
[58] Field of Search .............................. 494/49, 52, 84, 494/900; 210/360.1, 380.1, 380.3, 372–374, 511

[56] References Cited

U.S. PATENT DOCUMENTS 2,776,193  1/1957  Habicht .
3,459,368  8/1969  Dollfus ........................................ 233/15

FOREIGN PATENT DOCUMENTS 1541754  9/1968  France .
2093055  1/1972  France .
9219371  5/1991  WIPO .

*Primary Examiner*—Frank Spear
*Attorney, Agent, or Firm*—Pearne, Gordon, McCoy & Granger

[57] ABSTRACT

A centrifugal extractor comprising several superimposed stages (E1, E2, E3) has a fixed casing (10) within which rotate at high speed bowls (22) driven by a common vertical shaft (18). An immiscible light liquid and heavy liquid are emulsified and injected into a separating compartment (32) defined by each of the bowls (22) by ducts (54) forming ejectors and which are formed in the lower wall of the corresponding bowl. The light phase passes upwardly from one stage to the next by annular passages (46) surrounding the shaft (18), while the heavy phase redescends by gravity in return channels (44) formed in the fixed casing. This avoids turbulence in the separating compartments (32) and there is a reduction of the risks of clogging as a result of solid particles being present in the heavy phase.

12 Claims, 2 Drawing Sheets

5,453,192

MULTISTAGE CENTRIFUGAL EXTRACTOR

BACKGROUND OF THE INVENTION

The invention relates to a centrifugal extractor comprising several superimposed stages in which two normally immiscible liquids are brought together in order to ensure the treatment of a first of the liquids by a second one of the liquids.

It should be noted that at least one of the two liquids brought together within the extractor can also contain suspended solid particles.

Centrifugal extractors are apparatuses producing an emulsion of a liquid to be treated and a treatment liquid, which are normally immiscible, with a view to aiding the treatment and then ensuring the separation of the two liquids by centrifuging. The liquid to be treated can in particular be constituted by a heavy aqueous phase, whereas the treatment liquid is a light, organic phase.

In practice, it is usually necessary to repeat these two operations a certain number of times in order to optimize the treatment. For this purpose, use is normally made of centrifugal extractors having several superimposed stages. In these centrifugal extractors the heavy aqueous phase to be treated circulates from top to bottom which is from the upper stage to the lower stage, whereas the light organic phase ensuring the treatment circulates from bottom to top which is from the lower stage to the upper stage of the apparatus.

Among the existing centrifugal extractors with superimposed stages, reference is made to the centrifugal extractors of type LX marketed by ROBATEL SLPI. Within a fixed enclosure, these centrifugal extractors comprise a bowl which can be rotated at high speed around a vertical axis and which defines internally several superimposed separating compartments. The rotary bowl is in turn placed coaxjelly around a fixed, central, tubular barrel or shaft, which extends towards the inside each of the separating compartments.

In the bottom of each of the separating compartments, the rotary bowl has a mixing chamber, which is separately penetrated by the heavy phase from the stage located immediately above, and the light phase from the stage located immediately below. A stirring disk, integral with the fixed central shaft or barrel, cooperates with the walls of the mixing chamber rotating at high speed in order to bring about an extremely fine emulsion of the light and heavy phases. Moreover, the assembly constituted by the mixing chamber, as well as the channels for introducing and discharging the two phases into and out of said chamber, together with the stirring disk, form a pump permitting the suction of the two phases from the adjacent stages.

The two phases of the emulsion created in this way are then separated by centrifugal force in the separating compartment of the corresponding stage. The relatively light phase is admitted into the mixing chamber of the stage immediately above it by a passage located in the vicinity of the fixed, central shaft. The relatively heavy phase redascends towards the mixing chamber of the stage immediately below it by channels located on the outer periphery of the rotary bowl.

Centrifugal extractors having several superimposed stages and constructed in this way are essentially satisfactory, but suffer from two significant disadvantages.

The first of these disadvantages results from the circulation of the heavy phase from a given stage to the stage immediately below it by channels formed in the rotary bowl on the periphery thereof. In view of the fact that the bowl rotates at very high speeds and which can, for example, reach approximately 20 to 30 m/s, the solid particles generally present in the heavy phase tend to agglomerate under the effect of the centrifugal force, which leads to clogging actions necessitating the stopping of the apparatus. Moreover, the high density of the agglomerated solid materials, due to the centrifugal force, makes the unclogging operations long and difficult.

A second disadvantage of centrifugal extractors with several superimposed stages of the type described hereinbefore is due to the air present within the apparatus. During the rotation of the bowl, the air is positioned between the fixed, central shaft and the liquid contained in the separating compartments. However, in view of the fact that the liquid is rotated at high speed by the rotary bowl, whereas the air layer in contact with the central shaft is virtually static, turbulence occurs and passes from the air into the liquid phases contained in the different separating compartments. This turbulence disturbs the separating efficiency obtained by centrifuging in the separating compartments, so that the efficiency of each stage is reduced.

FR-A-2 093 055 also discloses a centrifugal extractor having several juxtaposed stages, in which each of the extractor stages comprises a fixed casing or housing within the interior of which a bowl internally defining a separating compartment is rotated about a vertical shaft. The heavy and light phases are brought into the bottom of the fixed casing, where they are mixed by paddles integral with the rotary bowl, before rising in an axial passage located in the bottom thereof. This rising action is brought about by a pumping effect obtained by the cooperation of fixed blades carried by an axial rod integral with the casing and rotary blades installed in the axial passage of the rotary bowl traversed by said rod. The heavy and light phases are consequently introduced into a separating compartment formed within the bowl, so as to be separated by centrifuging. Overflows provided at the upper end of the separating compartment make it possible to pass the heavy and light phases respectively towards the two adjacent stages using vertical channels formed in the fixed casing of the stage in question.

This centrifugal extractor does not suffer from the disadvantages of that described hereinbefore. Thus, the path of the heavy phase between the adjacent stages takes place by gravity within the fixed casing, which considerably reduces clogging risks and facilitates unclogging when this proves necessary. Moreover, the air layer contained in the rotary bowl is in contact with the rotary shaft used for driving said bowl and with the liquid rotated in the latter. Consequently the turbulence caused in the liquid is reduced compared with the centrifugal extractor having several superimposed stages described hereinbefore. Therefore the efficiency of each individual stage is considerably improved.

However, the centrifugal extractor described in FR-A-2 093 055 has several juxtaposed stages, which requires a separate motor for rotating each of the extractor stages. This increases the overall dimensions, the prime cost and the operating costs of the apparatus. Moreover, this contributes to an increase in breakdown risks.

Moreover, the design of the centrifugal extractor described in FH-A-2 093 055 is such that the transposition of the solution proposed in the case of an extractor having several juxtaposed stages to an extractor having several superimposed stages is virtually impossible to carry out. In particular, the pumping of the mixed liquid, enabling it to rise within the rotary bowl into the separating compartment is obtained by a cooperation of fixed and rotary blades formed respectively on an axial rod integral with the bottom of the fixed casing and in an axial passage formed in the bowl around said rod. It is therefore impossible to downwardly extend the vertical driving shaft of the rotary bowl in order to rotate the rotary bowls of other stages located below the first stage.

The object of the present invention is to provide centrifugal extractor having several superimposed stages, whose original design makes it possible to take advantage of the advances provided by the centrifugal extractor with juxtaposed stages according to FR-A-2 093 055, while only requiring a single drive motor in the same way as is used in the centrifugal extractors having several superimposed stages of a conventional nature.

SUMMARY OF THE INVENTION

According to the present invention, the object is obtained by providing a centrifugal extractor comprising a fixed casing, a vertical shaft able to rotate within the casing a bowl internally defining a separating compartment, a single drive motor for rotating said vertical shaft, and means for mixing end injecting into the bottom of the separating compartment a relatively heavy liquid phase and a relatively light liquid phase. The bowl has at its upper end at least one central passage for the discharge of the relatively light phase and at least one peripheral passage for the discharge of the relatively heavy phase. The extractor comprises a plurality of superimposed stages, each having a bowl which can be rotated by the shaft. The central passage of each stage being an annular passage formed between the shaft and a tubular wall integral with the bowl of the stage and communicating with the mixing and injecting means of an upper stage, whereas the peripheral passage of each stage issues into a return channel for the relatively heavy phase formed in the fixed casing and communicating with the mixing and injecting means of a lower stage.

Advantageously, the mixing and injecting means of the relatively heavy and relatively light phases in each separating compartment comprise ducts forming ejectors. The erectors are positioned along a horizontal plane in a lower wall of the bowl defining the compartment. The ducts are inclined with respect to a radial direction and located in the same horizontal plane.

Preferably, a lower intake end of each of the ducts forming ejectors is rotated in front of guidance grooves for the relatively heavy phase. The guidance grooves are formed in the fixed vessel and radially and inwardly from the return channel for the relatively heavy phase. Connecting passages formed in the lower wall of the bowl connect an upper end of the annular passage to an outer discharge end of each of the ducts forming ejectors.

In this arrangement, the inclined ducts forming ejectors carry out, in combination with the guidance grooves for the relatively heavy phase, the pumping of the two phases and their intimate mixing at the outlet of the inclined ducts.

Preferably, the inclined ducts forming ejectors issue by their outer discharge ends into the guidance grooves for the relatively heavy and relatively light phase, formed radially in the lower wall of the bowl and whereof an outer end issues into the separating compartment.

To ensure that the relatively heavy phase does not descend directly into the lower stage, the guidance grooves for said relatively heavy phase have a radially oriented portion, which extends upwardly until arriving in front of said inclined ducts forming ejectors by a vertically oriented portion.

In order to facilitate the flow of the relatively heavy phase during its descent by gravity towards the lower stage, the return channel of the relatively heavy phase of each stage is angularly displaced by a given value relatively to the return channels of the adjacent stages.

The fitting and dismantling of the centrifugal extractor can be facilitated by producing the bowls of the different stages in the form of separate parts mounted on a common vertical shaft. Furthermore, the fixed casing can be produced in the form of an elementary part for each stage with said elementary parts being assembled together in a tight manner.

BRIEF DESCRIPTION OF THE DRAWINGS

The invention is described in greater detail hereinafter relative to a non-limitative embodiment end with reference to the attached drawings, wherein show.

DETAILED DESCRIPTION OF THE PREFERRED EMBODIMENTS

Figure 1:
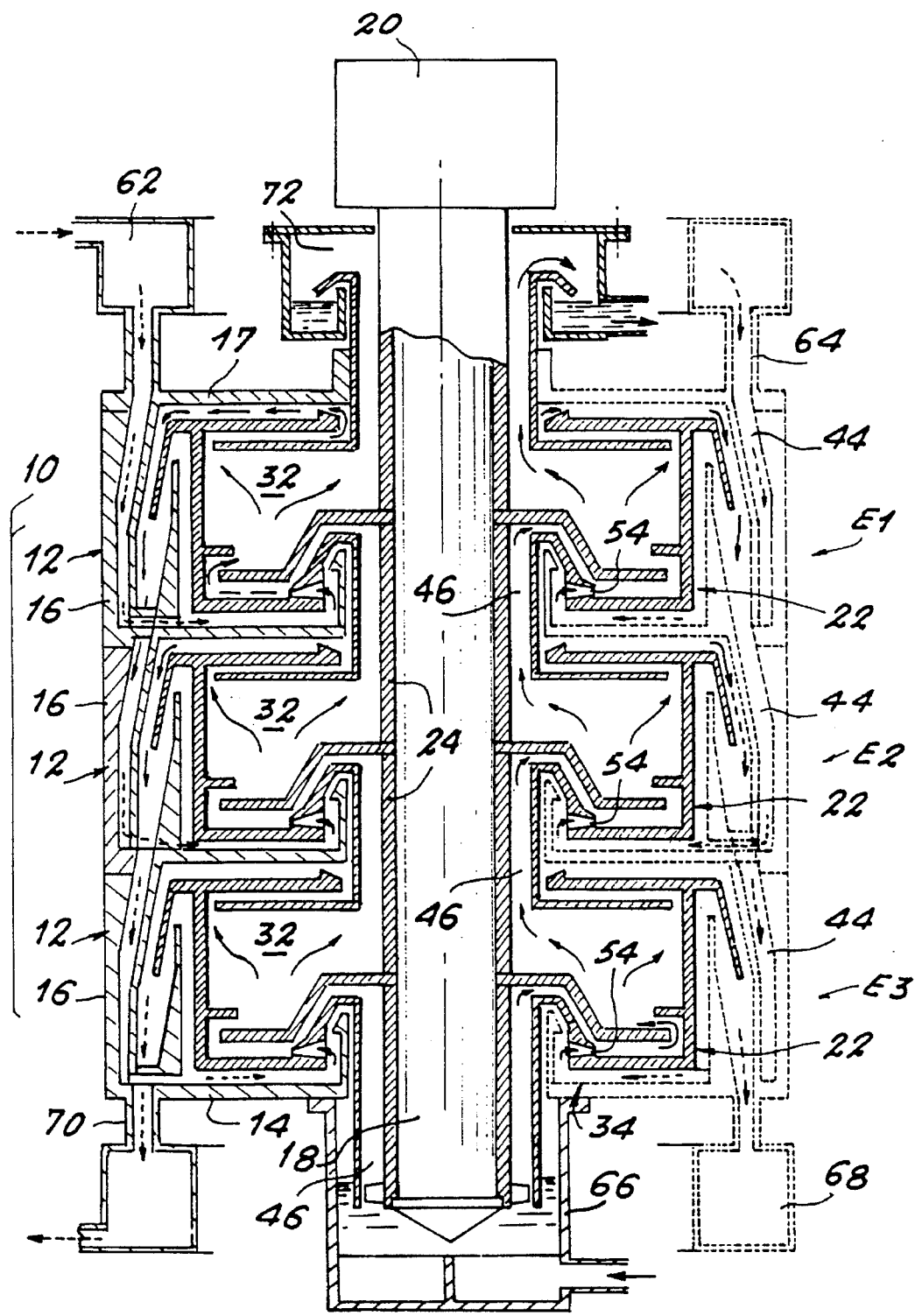
FIG. 1 A side view in longitudinal section diagrammatically illustrating a centrifugal extractor having several superimposed stages according to the invention.

As is diagrammatically illustrated in FIG. 1, the centrifugal extractor according to the invention comprises a generally cylindrical, fixed outer casing or housing 10, centered on a vertical axis of the machine. This casing 10 has a certain number of superimposed, elementary parts 12, e.g. three in the embodiment shown and which are tightly assembled by not shown, appropriate means.

The elementary parts 12 are all identical and are generally in the form of cylindrical vessels having a horizontal base 14 (FIG. 2) and a cylindrical, peripheral wall 16. Under the effect of the superimposing of the different elementary parts 12 during assembly, the base 14 of each of them forms a cover for the vessel located immediately below the same. The elementary part 12 located in the upper part of the apparatus is sealed by a cover 17.

The elementary parts 12 of the fixed casing 10 define a plurality of superimposed stages (three in the embodiment illustrated in FIG. 1) and which are designated E1, E2 and E3 starting from the top in FIG. 1.

The centrifugal extractor diagrammatically illustrated in FIG. 1 also comprises an assembly able to rotate at very high speed within the casing 10 about the axis of the casing 10. This assembly comprises a vertical drive shaft 18, which traverses over its entire height the fixed casing 10 and whose upper end is adapted for rotation at very high speed by a motor 20.

The shaft 18 carries the same number of bowls 22 as the extractor has stages, i.e. three in the embodiment shown. Each of these bowls 22 constitutes a separate part placed within one of the elementary vessel-like parts 12 of the fixed casing 10. Consequently, each of the stages E1 to E3 of the centrifugal extractor has a bowl 22 which can be rotated at very high speed by the motor 20 by means of the vertical shaft 18.

The fitting of the bowls 22 to the vertical shaft 18 is brought about by means of sleeves 24 forming spacers and which are placed on the shaft 18. The internal peripheral edge of a lower wall 26, shaped like a disk (FIG. 2), of each of the bowls 22 is gripped between two adjacent sleeves 24.

Figure 2:
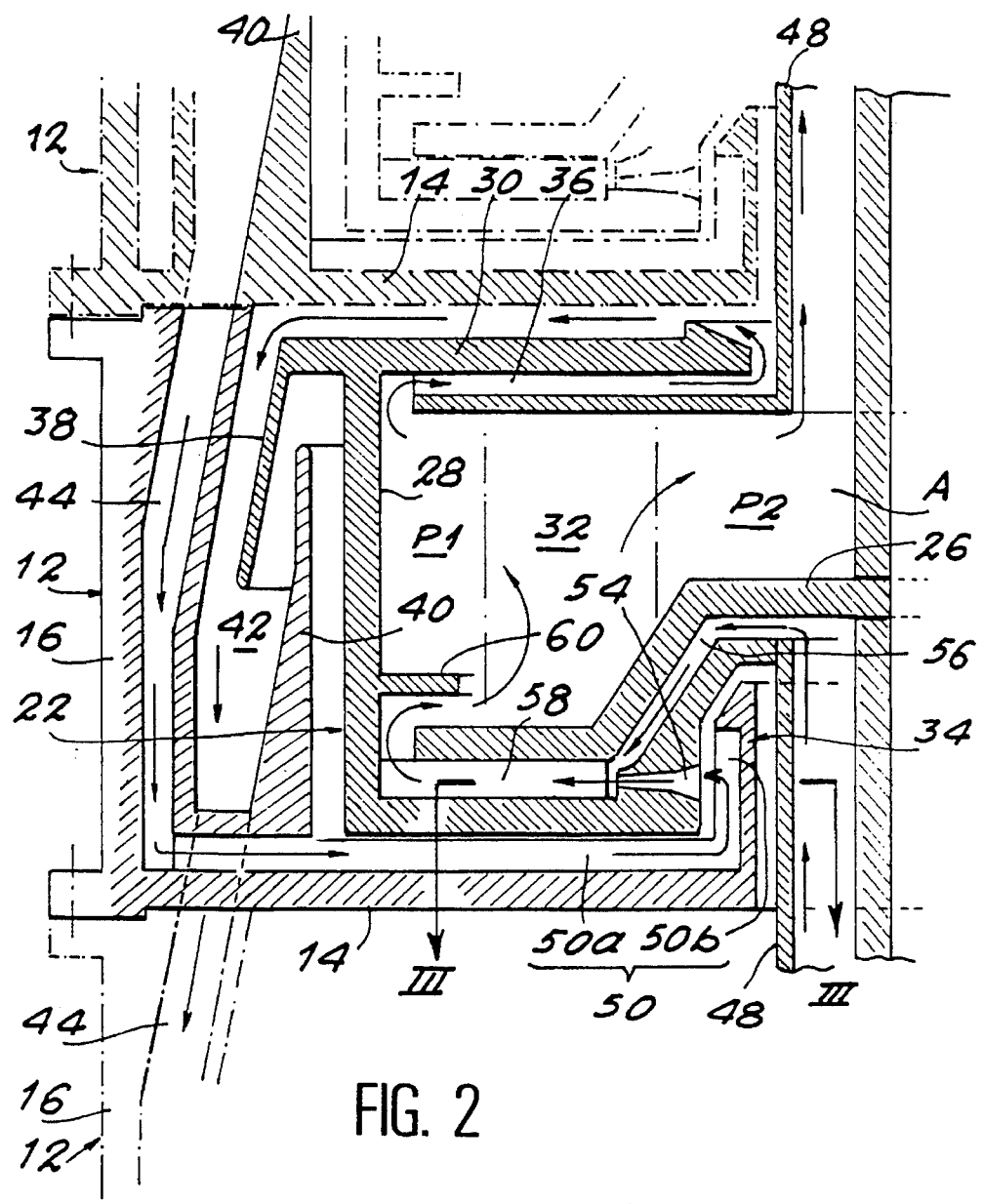
FIG. 2 A longitudinal sectional view comparable to FIG. 1 illustrating on a larger scale one the stages of the centrifugal extractor according to the invention.
Figure 3:
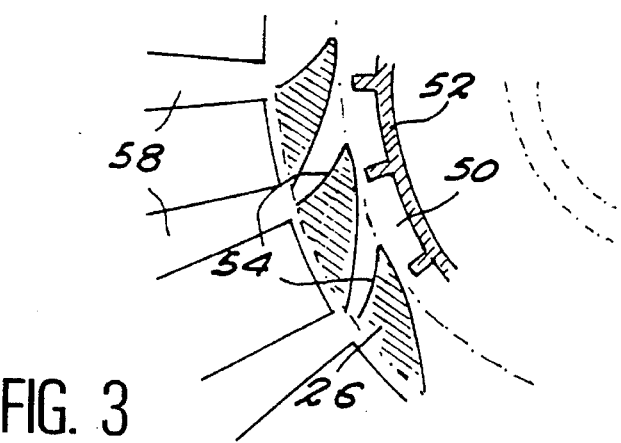
FIG. 3 A sectional view along line III—III of FIG. 2.

As is more specifically illustrated by FIG. 2, each of the bowls 22 also has a cylindrical, outer wall 28 and a horizontal, upper wall 30, also shaped like a disk. The lower wall 26 of the bowl 22 of a given stage is positioned immediately above the base 14 of the elementary part 12 of said stage and the peripheral, outer wall 28 is placed immediately within the peripheral wall 16 of the elementary part 12 of said same stage. Finally, the upper wall 30 of the bowl 22 of a given stage is positioned immediately below the base 14 of the elementary part 12 of the stage immediately above it, or immediately below the cover 17 for the stage E1.

Each of the centrifugal extractor bowls 22 internally defines, between its walls 26, 28 and 30, a separating compartment 32 in which immiscible, light and heavy phases of an emulsified liquid introduced into said compartment are separated by centrifuging. The introduction of the liquid takes place through the base of the separating compartment 32 using means 34 for the mixing and injection of the light and heavy liquid phases into the base of the separating compartment 32. These means 34, which will be described in greater detail hereinafter, are partly formed in the lower wall 26 of the bowl 22 and partly in the base 14 of the elementary part 12 of the corresponding stage.

At the bottom of each of the centrifugal extractor stages, the means 34 consequently make it possible to mix a relatively light liquid and a relatively heavy liquid, or more specifically bring about a finely divided emulsion of the two immiscible liquids, in order to ensure the treatment of the heavy phase by the light phase. The means 34 also make it possible to pump the thus formed emulsion in order to make it rise in the separating compartment 32 of the corresponding bowl 22.

Under the effect of the very high speed rotation of the bowl 22, the heavy and light phases of the emulsion ejected into the separating compartment 32 are automatically separated from one another under the effect of the centrifugal force. Thus, the heavy phase P1 is in the vicinity of the outer, peripheral wall 28 of the bowl 22, while the light phase P2 is in the vicinity of the sleeve 24 forming a spacer and from which it is separated by an air layer A.

It is important to note that the air layer A is only in contact with the parts or products rotating at the same speed as the bowl 22. Thus, the air layer A is in contact with the different parts of the bowl 22, with the sleeve 24 forming a spacer and with the light phase P2 rotating with the bowl. Consequently, the air layer A also tends to rotate with the bowl 22, so that there is virtually no turbulence within the bowl and the separation of the two phases of the liquid under the effect of centrifugal force is obtained under optimum conditions.

The upper wall 30 of each of the bowls 22 has in its thickness passages 35, which are oriented radially with respect to the vertical axis of the apparatus. The outer end of each of these passages 36 issues into an area of the separating compartment 32 adjacent to the cylindrical, outer wall 28, so as to form a peripheral discharge passage for the heavy phase P1 located in said area.

The inner end of each of the passages 36 issues between the upper wall 30 and the base 14 of the elementary part 12 of the stage located immediately above it about a tubular wall 48 projecting upwards from the inner edge of the upper wall 30 of the bowl 22. The heavy phase P1 passing out of the separating compartment 32 through the passages 36 then passes towards the outside between the upper wall 30 and the adjacent base 14, as is illustrated by the arrows in FIG. 2.

When the heavy phase P1 strikes against the peripheral 16 of the elementary part 12 of the corresponding stage, the heavy phase P1 redascends by gravity between said wall 16 and a truncated cone-shaped deflector 38, which projects downwardly from the outer, peripheral edge of the upper wall 30 of the bowl 22. The base 14 of the elementary part 12 carries a ferrule 40, which projects upwardly, between the outer, cylindrical wall 28 of the bowl 22 and the deflector 38, up to a level well above that of the lower edge of the deflector 38. The fall by gravity of the heavy phase P1 then continues in the substantially vertical passages 42 formed between the outer, peripheral wall 16 and the ferrule 40.

These passages 42 extend downwardly by substantially vertical passages 44 formed in the peripheral wall 16 of the elementary part 12 of the stage located immediately below the preceding stage. This leads to an automatic recycling of the heavy phase P1 of a given stage to the intake of the mixing and injecting means 34 of the stage immediately below it.

With regard to the light phase P2 separated from the heavy phase P1 in each of the separating compartments 32, it passes out of the compartment by an annular, central discharge passage 46 between the sleeves 24 mounted on the shaft 18 and the tubular wall 48 projecting upwardly from the inner edge of the upper wall 30 of the bowl 22 of the stage in question. In reality, this passage 46 essentially contains the air layer A and a film of the light phase P2, which rises along the inner surface of the tubular well 48 under the effect of the centrifugal force.

The light phase P2 from a given stage consequently rises up to the mixing and injecting means 34 of the stage immediately above it.

In order to bring about the mixing and injecting effect of the two phases from two stages adjacent to a stage in question, the means 34 have a special structure, which will now be described in greater detail relative to FIGS. 2 end 3.

When the heavy phase P1 has reached the lower end of each of the passages 44 in the peripheral wall 16 of each of the elementary parts 12 of the fixed casing 10, it is passed radially towards the interior above the base 14 of said elementary part using guidance grooves 50. These guidance grooves 50 are open on the side of the lower wall 26 of the bow; 22. The guidance grooves 50 have a first part 50a, which is oriented radially relative to the vertical axis of the apparatus. This first part 50a is extended upwardly by a second, vertically oriented part 50b, formed in the outer surface of a tubular wall 52 extending upwardly from the inner, peripheral edge of the lower wall 14 of the elementary part 12 about the tubular wall 48. This second, vertically oriented part 50b of the guidance grooves 50 is sealed et its upper end.

To enable the lower wall 26 to pass around the tubular wall 52, the lower wall 26 of each of the bowls 22 has a central, planar, horizontal part by which said wall 26 is fixed to the shaft 18 above the upper edge of the tubular wall 52, a planer, horizontal, peripheral part adjacent to the base 14 and an intermediate, truncated cone-shaped part linking the upper, central part and the lower, peripheral part. It should be noted that the tubular wall 48 of the adjacent lower stage is connected by its upper edge to the central part of the lower wall 26.

Ducts 54, forming ejectors, are provided in the lower wall 26 of the bowl 22 at the junction of the planar, peripheral part and the truncated cone-shaped, intermediate part facing the vertically oriented parts 50b of the guidance grooves 50. These ducts 54 are curved inwardly and inclined with respect to a radial direction and are all located in the same horizontal plane. In combination with the guidance grooves 50, this feature makes it possible to ensure the injection or pumping of the heavy phase P1 from the guidance grooves 50 to the separating compartment 32 of the corresponding stage.

The ducts 54 also have a section decreasing from their inner, intake end located in front of the vertically oriented parts 50b of the guidance grooves 50 and their outer, discharge end. This feature makes it possible for the inclined ducts 54 to fulfil an ejector function with respect to the light phase P2 from the stage immediately below the same of the apparatus. Thus, connecting passages 56 formed in the thickness of the central and intermediate parts of the lower well 26 of the bowl 23 link the annular, central passage 46 of the immediately lower stage to the outer discharge end of each of the ducts 54 forming ejectors. This brings about a pumping of the light phase P2 and its intimate mixing in the form of an emulsion with the heavy phase P1 admitted by the ducts 54.

At the outlet from the ducts 54 and the connecting passages 56, the two liquids are mixed or emulsified and passed towards the separating compartment 32 by divergent, radial guidance grooves 58 formed in the thickness of the peripheral part of the lower well 28 of the corresponding bowl 22. These guidance grooves issue at their outer end into the separating compartment 32 in front of a horizontal deflector 60 carried by the outer, cylindrical wall 28 of the bowl 22. This deflector 60 automatically brings the mixture to a central region of the compartment 32.

The light and heavy phases thus circulate in countercurrent within the centrifugal extractor between the different stages forming the latter, which has the effect of progressively bringing about the treatment of the heavy phase by the light phase, or vice versa, by means of mixing operations and then separating operations performed successively in each of the extractor stages.

FIG. 1 shows at 62 an intake collector for the heavy phase P1, located in the upper part of the centrifugal extractor and communicating with the return channels 44 of the upper stage E1 by vertical ducts 64, into which the heavy phase P1 flows by gravity.

The light phase P2 is introduced at the lower end of the apparatus by an annular collector 66. The latter issues into a lower annular passage 46, which is connected to the mixing and injecting means 34 equipping the lower stage E3 of the apparatus. Conversely, the heavy phase outflow takes place at the lower end or the apparatus by means of a collector 68, into which issue the ducts 70, each of which extends the return channels 44 of the lower stage E3.

Finally, light phase discharge takes place in the upper part or the centrifugal extractor by means of a fixed collecting compartment 72, into which issues the annular passage 46 of the upper stage E1.

The return channels 44 for returning the heavy phase from a given stage to the stage immediately below it are angularly displaced by a given value with respect to the return channels 44 of the immediately adjacent stages, so that channels can cross from one stage to the next without being interconnected.

Apart from the absence of turbulence in the separating compartments 32, the centrifugal extractor according to the invention has the advantage of ensuring the circulation of the heavy phase between the stages by return channels 44 formed in the fixed casing 10. As a result of this arrangement, the risks of clogging of said channels by solid particles present in the heavy phase are very significantly reduced compared with apparatuses in which the circulation of the heavy phase between the different stages takes place in the rotary part of the extractor. Moreover, the cleaning of the apparatus is greatly simplified in the case of clogging.

Moreover, manufacture and assembly of the centrifugal extractor are facilitated due to its modular design from this standpoint, the seal between the elementary parts 12 of the fixed casing 10 can be obtained either by placing O-rings between each of the elements, or by placing the complete casing in an outer sealing envelope.

Obviously, the invention is not limited to the embodiment described in exemplified manner hereinbefore and in fact covers all variants thereof. In particular, the number of stages constituting the centrifugal extractor can differ from three without passing outside the scope of the invention.

I claim:

1. Centrifugal extractor comprising a fixed casing (10), a vertical shaft (18) able to rotate within the casing a bowl (22) internally defining a separating compartment (32), a single drive motor for rotating said vertical shaft, and means (34) for mixing and injecting into a bottom of the separating compartment a relatively heavy liquid phase and a relatively light liquid phase, said bowl having at an upper end at least one central passage (46) for the discharge of the relatively light phase and at least one peripheral passage (36) for the discharge of the relatively heavy phase, wherein said extractor comprises a plurality of superimposed stages each of which comprise said mixing and injecting means and one bowl (22) having said central passage and said peripheral passage, said central passage (46) of each stage comprising an annular passage formed between said shaft (18) and a tubular wall (48) integral with the bowl of said stage and communicating with the mixing and injecting means (34) of an upper stage, said peripheral passage (36) of each stage issuing into a return channel (42, 44) formed in the fixed casing and communicating with the mixing and injecting means (34) of a lower stage.

2. Centrifugal extractor according to claim 1, wherein said mixing and injecting means (34) of each separating compartment (32) comprise ducts (54) forming ejectors, said ejectors being positioned along a horizontal plane in a lower wall of the bowl (22) defining said compartment, said ducts (54) being inclined with respect to a radial direction and located in a common horizontal plane.

3. Centrifugal extractor according to claim 2, wherein a lower intake end of said ducts (54) communicates with guidance grooves (50) for the relatively heavy phase formed in the fixed casing (10) and radially and inwardly extending from said return channel (44), and wherein connecting passages (56) formed in the lower wall of the bowl (22) connect an upper end of said annular passage (46) to an outer discharge end of the ducts.

4. Centrifugal extractor according to claim 3, wherein said ducts (54) issue from said outer discharge ends into guidance grooves (58) for the relatively heavy and relatively light phases, said guidance grooves being radially formed in said lower wall of the bowl (22) and having an outer end which issues into the separating compartment (32).

5. Centrifugal extractor according to claim 4, wherein said guidance grooves (50) for the relatively heavy phase have a radially oriented portion connected to said ducts (54) by a vertically oriented portion.

6. Centrifugal extractor according to claim 5, wherein said return channel (44) of each stage is angularly displaced relative to the return channels of adjacent stages.

7. Centrifugal extractor according to claim 6, wherein said bowls (22) of said stages are separate parts mounted on said vertical shaft (18).

8. Centrifugal extractor according to claim 6, wherein said fixed casing (10) comprises one elementary part (12) per stage, said elementary parts being tightly assembled together.

9. Centrifugal extractor according to claim 3, wherein said guidance grooves for the relatively heavy phase have a radially oriented portion connected to said ducts by a vertically oriented portion.

10. Centrifugal extractor according to claim 1, wherein said return channel of each stage is angularly displaced relative to the return channels of adjacent stages.

11. Centrifugal extractor according to claim 10, wherein said fixed casing comprises one elementary part per stage, said elementary parts being tightly assembled together.

12. Centrifugal extractor according to claim 1, wherein said bowls of said stages are separate parts mounted on said vertical shaft.

\* \* \* \* \*

UNITED STATES PATENT AND TRADEMARK OFFICE
CERTIFICATE OF CORRECTION

PATENT NO. : 5,453,192

DATED : September 26, 1995

INVENTOR(S) : Dollfus

It is certified that error appears in the above-indentified patent and that said Letters Patent is hereby corrected as shown below:

the Abstract, line 10, delete "redascends" and insert --redescends--.

Column 1, line 36, delete "coaxjelly" and insert --coaxially--; and
lines 57 and 58, delete "redascends" and insert --redescends--.

Column 2, line 2, delete "and".

Column 3, line 8, after "provide" insert --a--;
line 24, delete "end" and insert --and--; and
line 42, delete "erectors" and insert --ejectors--.

Column 4, line 6, delete "relatively" and insert --relative--; and
line 24, after "one" insert --of--.

Column 5, line 56, delete "35" and insert --36--.

Column 6, line 4, after "peripheral" insert --wall--;
line 6, delete "redascends" and insert --redescends--;
line 32, delete "well" and insert --wall--;
line 41, delete "end" and insert --and--;
line 48, delete "bow:" and insert --bowl--;
line 55, delete "et" and insert --at--; and
line 61, delete "planer" and insert --planar--.

UNITED STATES PATENT AND TRADEMARK OFFICE
CERTIFICATE OF CORRECTION

PATENT NO. : 5,453,192

DATED : September 26, 1995

INVENTOR(S) : Dollfus

It is certified that error appears in the above-identified patent and that said Letters Patent is hereby corrected as shown below:

Column 7, line 19, delete "23" and insert --22--;
   line 29, delete "well 28" and insert --wall 26--; and
   line 53, delete "or" and insert --of--.
Column 8, line 12, delete "design from" and insert --design.
   From--.

Signed and Sealed this

Thirtieth Day of April, 1996

Attest:

BRUCE LEHMAN

Attesting Officer            Commissioner of Patents and Trademarks